(12) United States Patent
Ely

(10) Patent No.: US 10,943,392 B2
(45) Date of Patent: Mar. 9, 2021

(54) DIGITAL ELEVATION MODEL QUALITY CONTROL

(71) Applicant: Raytheon Company, Waltham, MA (US)

(72) Inventor: Richard W. Ely, Lewisville, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/682,901

(22) Filed: Nov. 13, 2019

(65) Prior Publication Data

US 2020/0193701 A1 Jun. 18, 2020

Related U.S. Application Data

(60) Provisional application No. 62/780,592, filed on Dec. 17, 2018.

(51) Int. Cl.
*G06T 17/05* (2011.01)
*G06K 9/62* (2006.01)

(52) U.S. Cl.
CPC ............ *G06T 17/05* (2013.01); *G06K 9/6202* (2013.01)

(58) Field of Classification Search
None
See application file for complete search history.

(56) References Cited

FOREIGN PATENT DOCUMENTS

WO WO-2007037986 A2 4/2007

OTHER PUBLICATIONS

DeWitt et al., "Creating high-resolution bare-earth digital elevation models (DEMs) from stereo imagery in an area of densely vegetated deciduous forest using combinations of procedures designed for lidar point cloud filtering", Taylor & Francis Group, 2017. (Year: 2017).*

Zhang et al., "Comparison of Slope Estimates from Low Resolution DEMS: Scaling Issues and a Fractal Method for Their Solution", Wiley 1999. (Year: 1999).*

"International Application Serial No. PCT/US2019/066862, International Search Report dated Mar. 13, 2020", 5 pgs.

"International Application Serial No. PCT/US2019/066862, Written Opinion dated Mar. 13, 2020", 6 pgs.

"Landslide Change Detection Based on Multi-Temporal Airborne LiDAR-Derived DEM", Geosciences, 8(1):23, (Jan. 16, 2018), 19 pgs.

Hannah, M J, "Error detection and correction in digital terrain models", Photogrammetric Engineering and Remote Sensing USA, vol. 47, No. 1, (Jan. 1981), 63-69.

Richard, David Williams, "DEMs of Difference", Geomorphological Techniques, Chap. 2, Sec. 3.2, (Jan. 1, 2012), 1-17.

* cited by examiner

*Primary Examiner* — Nicholas R Wilson
(74) *Attorney, Agent, or Firm* — Schwegman Lundberg & Woessner, P.A.

(57) ABSTRACT

A method can include receiving, first and second digital elevation models (DEMs) including first elevation data of a geographic location and second elevation data of the geographic location, respectively, identifying differences between the first elevation data and the second elevation data that are greater than a first threshold, determining, for a point in the second elevation data identified to correspond to a difference greater than the first threshold, a slope of the geographic location around and including the point, and altering, in response to determining the difference is greater than a second threshold determined based on the determined slope, elevation data of the second DEM corresponding to the point.

20 Claims, 4 Drawing Sheets

DIGITAL ELEVATION MODEL QUALITY CONTROL

RELATED APPLICATION

This application claims the benefit of priority to U.S. Provisional Patent Application Ser. No. 62/780,592, filed on Dec. 17, 2018, and titled "3D Point Set Quality Control" which is incorporated herein by reference in its entirety.

TECHNICAL FIELD

Embodiments discussed herein regard devices, systems, and methods for altering a digital elevation model (DEM) for quality control. The DEM can be generated automatically (without human interference). The altered DEM can adhere to defined rules for a maximum allowable change in z-height between pixels.

BACKGROUND

Accuracy of DEMs is hard to monitor and confirm. Current processes to help guarantee accuracy of DEMs include tedious human review. The human review can have its own inconsistencies and consumes expensive and valuable worker time. A new, less human-resource intensive process, device, or system would be beneficial.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Embodiments generally relate to devices, systems, and methods for reducing error in elevation data. The elevation data can be generated based on a passive 3D point set or a digital elevation map (DEM).

A passive three-dimensional (3D) point set or other 3D points set can be extracted from imagery. The 3D point set can be altered to model the surface of the visible scene including removing 3D structures, such as portions of buildings (e.g., walls, windows, roofs, etc.), and vegetation (e.g., trees, shrubs, grass, etc.). Other elevation data, such as another DEM, can be generated of a same geographical area. This other elevation data can have some inconsistencies and accuracy of the elevation data can benefit from further processing. Elevation data can be from a DEM or other 3D point set. A difference between the DEM and other 3D point sets can include the DEM having a regular spacing between points, while other 3D point sets have irregular spacing between points.

Bare earth elevation alters a surface 3D point set so that, when the bare earth points are viewed, the image models a view of a geographic location as if buildings and trees or other foliage were not there. A surface elevation data set does not include such an alteration. A bare earth elevation, very likely includes points that violate rules regarding allowable changes in z-value in the point set relative to a prior generated bare earth DEM of the same geographic area. Embodiments are applicable to bare earth DEMs and other 3D point sets.

For example, there can be strict requirements on how far below an original z-value from the DEM a z-value in a new DEM of the same geographical location can be. This tolerance can depend on the local slope of terrain around the corresponding z-value. A looser tolerance rule (a larger change in z-value) can be defined for steeper terrain. Embodiments provide detection of deviations from the tolerance rule. Embodiments further provide correction of the deviations so that the DEM abides by the defined rules.

Figure 1:
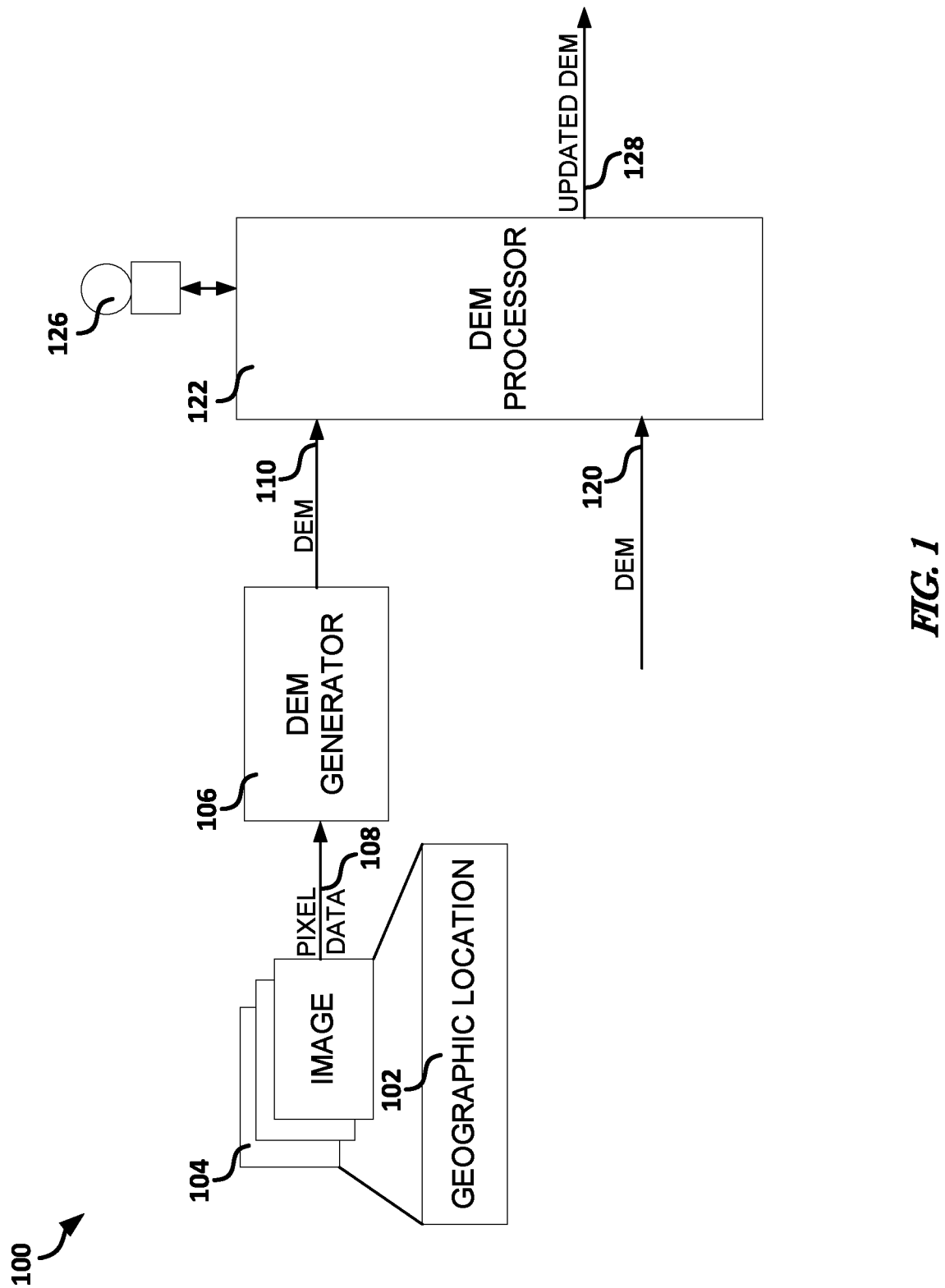
FIG. 1 illustrates, by way of example, a diagram of an embodiment of a method for updating a digital elevation model (DEM) based on DEMs of a same geographic region.

FIG. 1 illustrates, by way of example, a diagram of an embodiment of a system 100 for updating a DEM based on DEMs 110, 120 of a same geographic location 102. The system 100 of FIG. 1 includes operations for generating one of the DEMs, however, the embodiments herein are applicable to cases where both DEMs 110, 120 are provided (neither of them are generated by the system 100).

The system 100 as illustrated generates images 104 of a geographic location 102. The images 104 include pixel data 108 of the geographic location 102. The pixel data 108 can include gray scale, color, depth, distance, or other pixel data. The pixel data 108 can be generated by an optical imaging device, such as a camera or a light detecting and ranging (LIDAR) system.

In some embodiments, elevation data is determined by a device that generated the images 104. In other embodiments, elevation data can be determined based on the image data. The science of determining elevation data is sometimes called photogrammetry.

The images 104 can be from an aerial object or a close-range object. The images 104 can include overlapping fields of view, providing different perspectives of a same point in the geographic location 102. With trigonometry, assuming an angle between different perspectives of the same point and a distance between locations at which the different images were captured, the elevation of a point in the geographic location 102 can be determined based on the elevation of the object that captured the images.

In some embodiments, the pixel data 108 can be from a LIDAR system. The pixel data 108 in such embodiments can be used, by the DEM generator 106, to generate the DEM 110. Similar to how the pixel data from camera images can be used to generate different views, such as a bare earth view without foliage, man-made object, water, or the like, a surface map that includes one or more of the foliage or man-made objects, or the like, the pixel data 108 from the LIDAR system can be used to generate such views.

There are many methods of determining the elevation data based on the pixel data 108. Also, as previously discussed, there are many elevations that may be viewed or otherwise of interest. For example, one may want to know what the surface of the earth looks like without man-made structures (e.g., buildings, roads, vehicles, or the like), animals (e.g., humans, wild animals, domesticated animals, or the like), vegetation (e.g., trees, shrubs, etc.), or water (e.g., oceans, rivers, lakes, seas, etc.). Many methods of processing the image data 104 exist to determine elevations corresponding to these different surface views. The DEM generator 106 can determine the elevation data using any of the methods to provide a desired DEM 110.

The DEM generator 106 can be implemented using processing circuitry. The processing circuitry can include hardware, software, firmware, or a combination thereof. In some embodiments, the processing circuitry can include a processor, such as a central processing unit (CPU), graphics processing unit (GPU), field programmable gate array (FPGA), application specific integrated circuit (ASIC), or the like configured to perform the operations of the DEM generator 106. The processing circuitry can additionally or alternatively include electric or electronic components coupled to perform the operations of the DEM generator 106. The electric or electronic components can include one or more transistors, resistors, inductors, capacitors, diodes, oscillators, logic gates (e.g., AND, OR, XOR, negate, buffer, or the like), power supplies, regulators, converters (e.g., buck, boost, analog to digital, digital to analog, or the like), inverters, modulators, demodulators, ports, buses, or the like.

Another DEM 120 can be provided to a DEM processor 122 along with the DEM 110. The DEMs 110 and 120 can have different resolutions (points of elevation data per unit area). For example, one DEM can have a smaller resolution than another DEM of the same geographic location. The DEMs 110 and 120 can have different errors (confidence intervals associated with the elevation data of the 3D point set). For example, one DEM can be accurate to within an absolute elevation of ten meters, while another DEM can be accurate to within an absolute elevation of sixteen meters, or other elevation error. The error can be dependent on the resolution of the instrument used to generate the image 104 or the technique implemented by the DEM generator 106. One or more of the DEMs can be situated in a regular grid or include irregular spacing between points.

The error and resolution, along with changes in the geographic location 102 (e.g., erosion, new, changed, or removed structures or foliage, or the like) can cause the DEMs 110 and 120 to be different. It is not clear a priori whether the differences in the DEMs 110 and 120 are from the confidence intervals, resolutions, or changes in the environment. Discussed herein, are embodiments for determining whether the change in DEM (e.g., automatically, without human interference after deployment) is an error or an actual change in the geographical area and adjusting a DEM so that the DEMs 110 and 120 are more consistent.

A DEM processor 122 can receive one or more of the DEMs 110, 120 and the pixel data 108, 118. The DEM processor 122 can help increase the accuracy of the DEM 120 based on the DEM 110. The 3D point set processor 122 can include an image analyzer 124. The DEM processor 122 can implement a technique configured to determine whether differences between z-values of the DEMs 110 and 120 are due to physical changes at the geographical location 102. Additionally, or alternatively, a human-in-the-loop 126 can analyze the pixel data 108 or pixel data of images used to generate the vetted DEM 120 to determine whether the differences between z-values of the DEMs 110 and 120 are due to physical changes at the geographic location 102. The DEM processor 122 can include processing circuitry configured to perform one or more of the operations of the method 200. The DEM processor 122 can, by implementing the method 200, generate an updated DEM 128.

Figure 2:
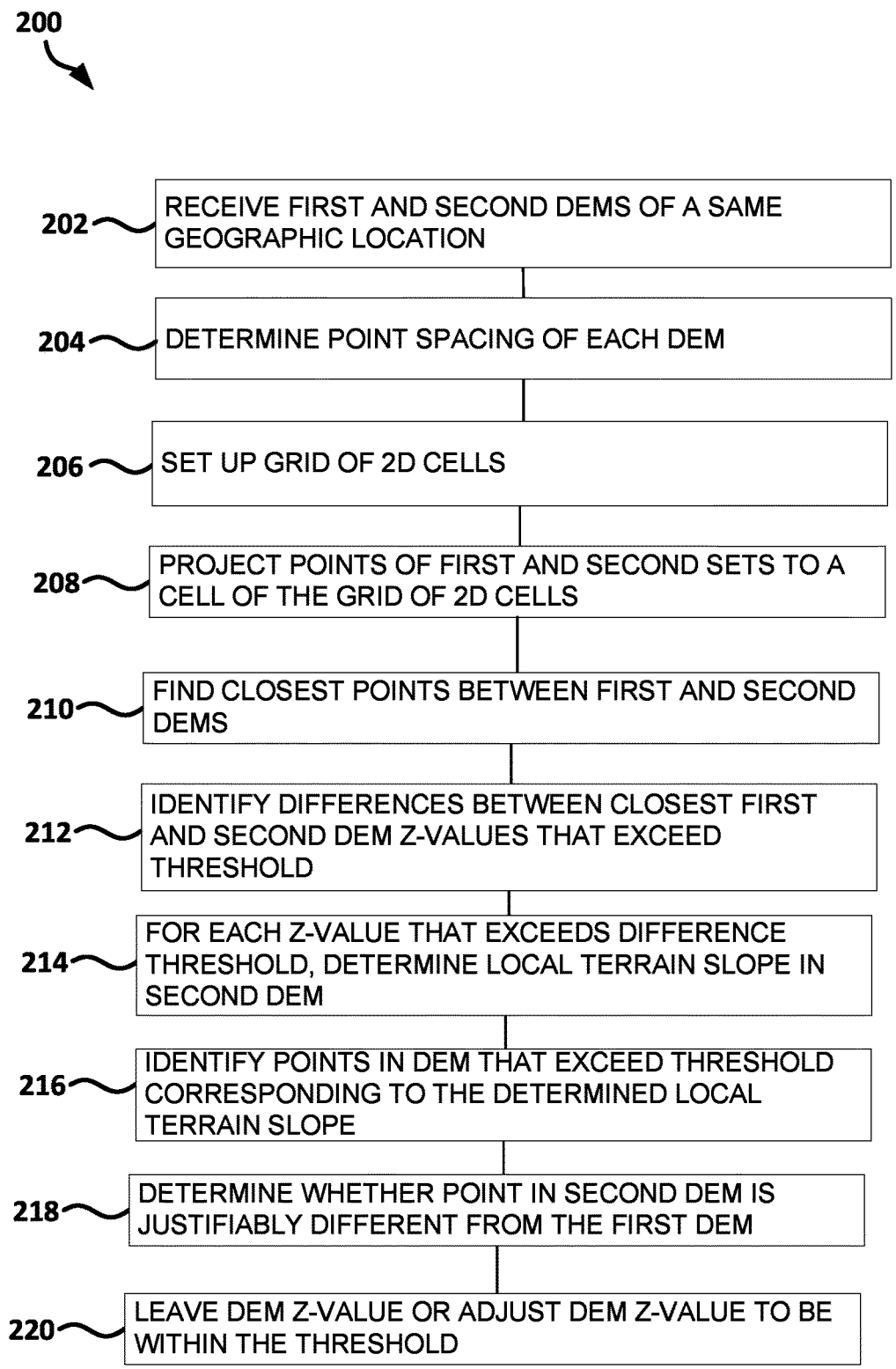
FIG. 2 illustrates, by way of example, diagram of an embodiment of a method for 3D point set quality control.

FIG. 2 illustrates, by way of example, diagram of an embodiment of a method 200 for DEM (or other 3D point set) quality control. The method 200 can improve the accuracy of a 3D point set 120 based on another DEM 110 and identify points that can benefit from further inspection. The method 200 as illustrated includes receiving first and second DEMs of a same geographical region, at operation 202; determining a point spacing for each of the first DEM and the second DEM, at operation 204; setting up a grid of cells based on the determined points spacing, at operation 206; projecting points of the first DEM and the second DEM to the grid of cells, at operation 208; finding closest points between the first DEM and second DEM in the grid of cells, at operation 210; identifying differences between z-values of closest points in the first DEM and the second DEM that exceed a threshold, at operation 212; determining, for each z-value that exceeds the threshold, a local terrain slope at the point in the second DEM, at operation 214; identifying points in the second DEM associated with a difference corresponding to a threshold based on the local terrain slope, at operation 216; determining whether the identified points in the second DEM set are justifiably different from the first DEM, at operation 218; and leaving the second DEM z-value or adjusting the second DEM z-value to be within the threshold, at operation 220.

The DEMs received at operation 202 can include the DEMs 110 and 120 or other 3D point sets. The operation 204 can include determining an average distance (e.g., x and/or y-distance in a coordinate system in which elevation is in a z-direction perpendicular to the x-y plane) between points of the DEMs 110, 120. The operation 204 can include, using an x-y rectangular region (e.g., near a center of the pixel data 108). The points in this rectangular region can be counted. The average spacing is the area of the rectangle divided by the number of points in the rectangular region. The larger point spacing of the two sets (which typically is associated with a bare earth DEM as compared to a passive 3D point set) can be used define a 2D x-y grid of cells at operation 206. The operation 206 can include determining which of the DEMs 110, 120 includes a larger resolution (larger spacing between points) and using that resolution as a resolution for the 2D grid of cells.

The operation 208 can be trivial for the DEM 110, 120 with the worse resolution in embodiments in which the larger resolution is used for the grid of 2D cells at operation 206. For this DEM, the cell in the DEM corresponds to a matching 2D cell in the grid of cells. The operation 208 can include determining, for a DEM with a different resolution than the grid of 2D cells, to which cell the corresponding DEM point is closest. The operation 208 can include using an x, y, and/or z-distance to determine to which cell the DEM point is closest. In some embodiments, one or more cells of the 2D cells can include one or more points from each of the DEMs 110, 120. The operation 208 can provide, for each grid cell, two lists of points (one from each of the DEMs 110, 120) that map to the cell.

Since there can be more than one point per cell from the DEMs 110, 120 and because a point of one DEM in a first cell of the 2D cells can be closer to a point of another DEM in a second cell of the 2D cells, performing the operation 210 can be non-trivial. The closest point can be determined based on a horizontal distance (e.g., in an x-y plane) or a 3D distance between values of the point. To help reduce processing time, only points of both DEMs 110, 120 in adjacent cells can be compared at operation 210. In some embodiments, the operation 210 can include determining a distance between a point of interest from a first DEM and each point of a second DEM within a same cell and cells contiguous with the same cell. This can significantly reduce the overhead of performing the operation 210. The operation 210 can identify one or more points in a first DEM that are closest to one or more points in the second DEM. In some examples, a single point of the first DEM can be closer to multiple points of the second DEM than other points of the first DEM. In case of a tie between determined distances, a heuristic can determine which point is chosen as the closest point. The heuristic can include choosing the point in the same cell as the point under consideration, the point in a cell with lower or higher cell number, randomly choosing the point, or the like.

A result of the operation 210 is summarized in table 1:

TABLE 1

Example Result of Operation 210

| POINT IN FIRST DEM | CLOSEST POINT IN SECOND DEM |
|---|---|
| (POINT ID, z) | (POINT ID, z) |
| (POINT ID, z) | (POINT ID, z) |
| ... | ... |
| (POINT ID, z) | (POINT ID, z) |

As previously discussed, differences between elevation values can appear for a variety of reasons. Some of these reasons can include error in the processing of the pixel data 108, 118 to determine the elevation values or can include physical changes in the geographical location 102. There can be some maximum tolerance that an entity has for changes in the DEMs 110, 120. In some examples, the maximum change can be different for different terrain.

Figure 3:
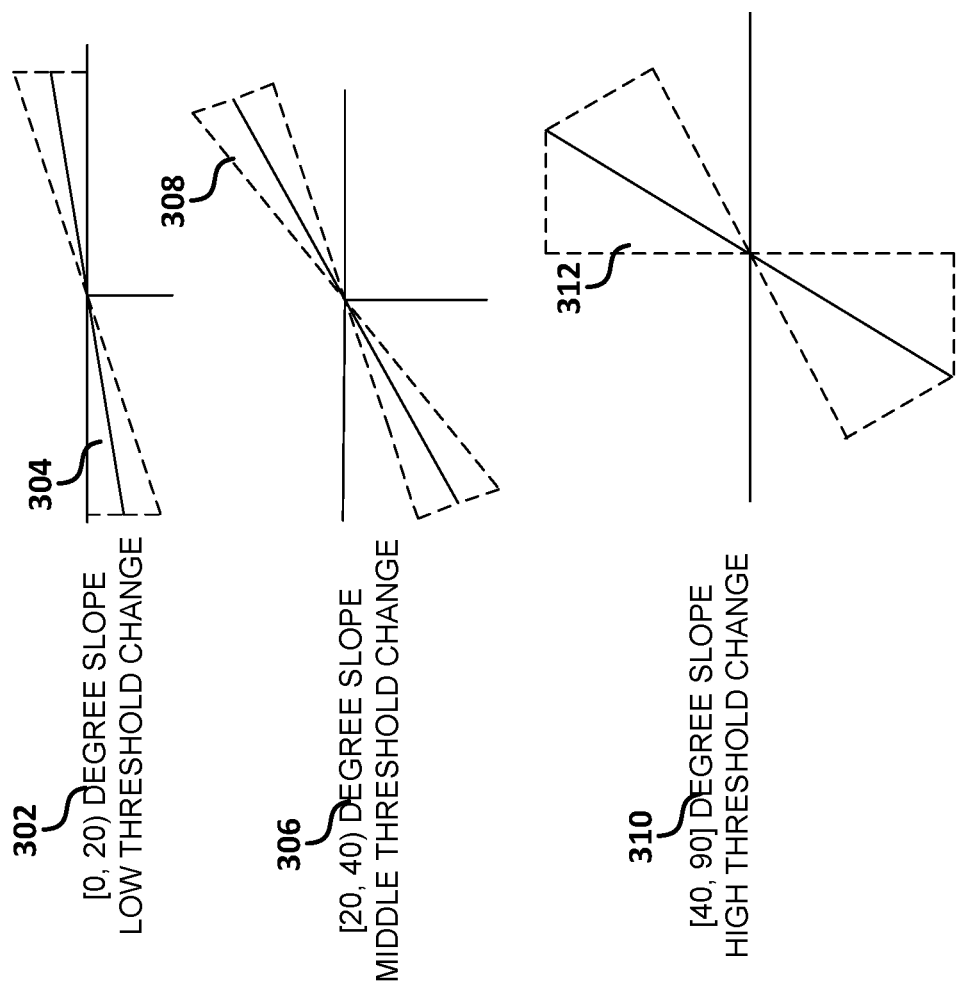
FIG. 3 illustrates, by way of example, a diagram of an embodiment of rules defining maximum changes based on terrain slope.

FIG. 3 illustrates, by way of example, a diagram of an embodiment of rules defining maximum changes based on terrain slope. The operation 214 can include determining, for each z-value difference that is determined to exceed a difference threshold, determining a local terrain slope of the points in the second DEM. The operation 214 can include accumulating all the 3D points in the DEM 120 within a specified distance of the point in consideration. For all points within the specified distance a least-squares fit of a plane to these points can be determined. The slope of the determined plane can be used as the local slope of the terrain.

The rules of FIG. 3 include ranges of slopes 304, 308, and 312 and corresponding threshold changes 302, 306, and 310 between the elevation data of the 3D point sets 110, 120. Since for flatter ground it easier to extract accurate z values and since errors in the computed z values cause more problems for both the analyst and automated exploitation algorithms than for steeper terrain, the threshold change for flatter ground can be lower than the threshold change for steeper ground. For efficiency the difference threshold used at operation 214 can be set to the lowest threshold change 302. This helps filter out any changes in the DEM data that are expected or acceptable, since these differences are acceptable regardless of the threshold corresponding to the slope.

In the example of FIG. 3, there are three ranges of slopes 304, 308, and 312 and three corresponding different threshold changes 302, 306, and 310. The low threshold change 302 is smaller than the middle threshold change 306, which is smaller than the high threshold change 310. While FIG. 3 illustrates three ranges of slopes 304, 308, and 312 and three corresponding rules 302, 306, and 310, with thresholds corresponding to the respective slopes, fewer or more rules or slopes can be used. For example, a single threshold can be defined, and if the z-value change between DEMs is greater than, or equal to the threshold, the z-values can be further scrutinized at operation 218. In another example, more slopes and thresholds can be defined and if the z-value change between the DEMs is greater than the difference threshold, the slope can be determined and compared to the threshold corresponding to the determined slope. If the z-value difference is greater than (or equal to) the threshold for the slope, further scrutiny can be applied to the point at operation 218.

While the rules of FIG. 3 are illustrated as being based on ranges of slopes other rules bases can be applied, such as thresholds based on absolute z-value change regardless of slope, or a threshold based the z-value, or a threshold base on the standard of the z-values around the point, or the like. The operation 216 can include identifying the acceptable threshold for the determined slope and comparing the difference determined at operation 212 to the identified threshold. For points that do not exceed the identified threshold, no further processing needs to be done, because the rule was not violated. For points that do exceed the identified threshold, the operation 218 can be performed.

The operation 218 can include analysis by a human-in-the-loop 126 or a computer analysis of the images 104, 114, or the like. The human-in-the-loop 126 can include a person. The human-in-the-loop can analyze the images 104, 114, the pixel data 108, 118 or other information regarding the geographic location 102 at the point with the z-value discrepancy. For example, it can be determined, based on picture grayscale, color, or other images if there is a physical change at the location with the z-value discrepancy. This analysis can be accomplished by a human-in-the-loop or a computer program. Justifiable changes in the image are those that do not correspond to errors in the generation of the DEM 110, 120. Examples of justifiable changes include those corresponding to physical changes in the geographic location 102. A physical change in the geographic location 102 can include erosion, a mudslide, volcano eruption, sinkhole forming, fire alteration, an object being placed or built, or the like.

In some embodiments, to facilitate manual review of the updated 3D data 128, the DEM processor 122 can append attributes to each point in the output set. The attributes can include the original z-value in the second DEM 120 that was changed, the z-value of the closest point in the DEM 110, the z-delta between the closest z-values in the corresponding sets, the computed local slope at the point, and the tolerance that was applied to determine whether the point was within spec, among others.

Figure 4:
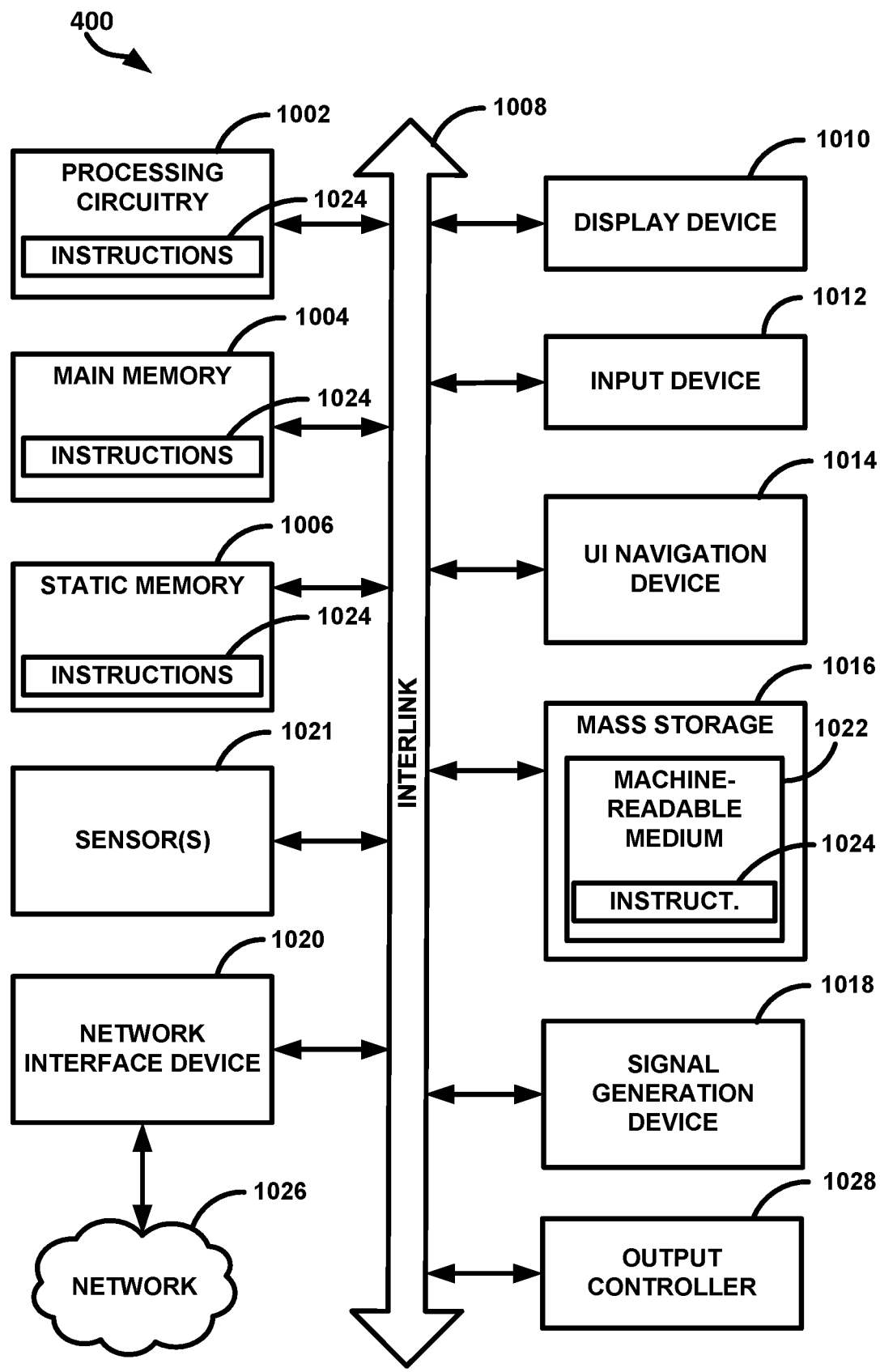
FIG. 4 illustrates, by way of example, a block diagram of an embodiment of a machine on which one or more of the methods, such as those discussed about FIGS. 1-3 and elsewhere herein can be implemented.

FIG. 4 illustrates, by way of example, a block diagram of an embodiment of a machine 400 on which one or more of the methods, such as those discussed about FIGS. 1-3 and elsewhere herein can be implemented. In one or more embodiments, one or more items of the system 100 can be implemented by the machine 400. In alternative embodiments, the machine 400 operates as a standalone device or may be connected (e.g., networked) to other machines. In one or more embodiments, one or more items of the system 100 can include one or more of the items of the machine 400. In a networked deployment, the machine 400 may operate in the capacity of a server or a client machine in server-client network environment, or as a peer machine in a peer-to-peer (or distributed) network environment. The machine 400 may be a personal computer (PC), a tablet PC, a set-top box (STB), a Personal Digital Assistant (PDA), a cellular telephone, a web appliance, a network router, switch or bridge, embedded computer or hardware, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 400 includes processing circuitry 1002 (e.g., a hardware processor, such as can include a central processing unit (CPU), a graphics processing unit (GPU), an application specific integrated circuit, circuitry, such as one or more transistors, resistors, capacitors, inductors, diodes, logic gates, multiplexers, oscillators, buffers, modulators, regulators, amplifiers, demodulators, or radios (e.g., transmit circuitry or receive circuitry or transceiver circuitry, such as RF or other electromagnetic, optical, audio, non-audible acoustic, or the like), sensors 1021 (e.g., a transducer that converts one form of energy (e.g., light, heat, electrical, mechanical, or other energy) to another form of energy), or the like, or a combination thereof), a main memory 1004 and a static memory 1006, which communicate with each other and all other elements of machine 400 via a bus 1008. The transmit circuitry or receive circuitry can include one or more antennas, oscillators, modulators, regulators, amplifiers, demodulators, optical receivers or transmitters, acoustic receivers (e.g., microphones) or transmitters (e.g., speakers) or the like. The RF transmit circuitry can be configured to produce energy at a specified primary frequency to include a specified harmonic frequency.

The machine 400 (e.g., computer system) may further include a video display unit 1010 (e.g., a liquid crystal display (LCD) or a cathode ray tube (CRT)). The machine 400 also includes an alphanumeric input device 1012 (e.g., a keyboard), a user interface (UI) navigation device 1014 (e.g., a mouse), a disk drive or mass storage unit 1016, a signal generation device 1018 (e.g., a speaker) and a network interface device 1020.

The mass storage unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processing circuitry 1002 during execution thereof by the machine 400, the main memory 1004 and the processing circuitry 1002 also constituting machine-readable media. One or more of the main memory 1004, the mass storage unit 1016, or other memory device can store the job data, transmitter characteristics, or other data for executing the method 900.

The machine 400 as illustrated includes an output controller 1028. The output controller 1028 manages data flow to/from the machine 400. The output controller 1028 is sometimes called a device controller, with software that directly interacts with the output controller 1028 being called a device driver.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that can store, encode or carry instructions for execution by the machine and that cause the machine to perform any one or more of the methodologies of the present invention, or that can store, encode or carry data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1024 may further be transmitted or received over a communications network 1026 using a transmission medium. The instructions 1024 may be transmitted using the network interface device 1020 and any one of several well-known transfer protocols (e.g., hypertext transfer protocol (HTTP), user datagram protocol (UDP), transmission control protocol (TCP)/internet protocol (IP)). The network 1026 can include a point-to-point link using a serial protocol, or other well-known transfer protocol. Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that can store, encode or carry instructions for execution by the machine, and includes digital or analog communications signals or other intangible media to facilitate communication of such software.

EXAMPLES AND ADDITIONAL NOTES

Example 1 can include a method for ensuring accuracy of data in a digital elevation model (DEM), the method comprising receiving, first and second DEMs including first elevation data of a geographic location and second elevation data of the geographic location, respectively, identifying, by DEM processing circuitry, differences between the first elevation data and the second elevation data that are greater than a first threshold, determining, for a point in the second elevation data identified to correspond to a difference greater than the first threshold, a slope of the geographic location around and including the point, and altering, in response to determining the difference is greater than a second threshold determined based on the determined slope, elevation data of the second DEM corresponding to the point.

In Example 2, Example 1 can further include, before identifying the differences determining a point spacing between adjacent points of the first DEM and a point spacing between adjacent points of the second DEM, and projecting points of the first and second elevation data to a two-dimensional (2D) grid of cells.

In Example 3, Example 2 can further include, for each point in the second elevation data, identifying a closest respective point of the first elevation data, and wherein identifying difference between the first elevation data and the second elevation data includes, for each point in the second elevation data, determining a difference between the point in the second elevation and the identified closest respective point of the first elevation data.

In Example 4, Example 4 can further include, for each point in the second elevation data, comparing the determined difference to the first threshold.

In Example 5, at least one of Examples 2-4 can further include, wherein the 2D grid of cells includes a regular spacing between cells and the regular spacing is equal to the determined spacing between points of the first DEM or the second DEM.

In Example 6, at least one of Examples 1-5 can further include, wherein the second threshold is one of a plurality of different thresholds for non-overlapping ranges of slope.

In Example 7, Example 6 can further include, wherein the second threshold is smaller for a first range of slopes that is less than a second range of slopes.

In Example 8, at least one of Examples 6-7 can further include, wherein the first threshold is less than, or equal to, the smallest of the plurality of different thresholds.

In Example 9, at least one of Examples 1-8 can further include, before altering the elevation data of the second DEM corresponding to the point and in response to determining the difference is greater than the second threshold, analyzing image data used to generate the first and second DEMs to determine whether the difference is associated with an error or a change in the geographic location.

In Example 10, Example 9 can further include, wherein altering elevation data of the second DEM corresponding to the point occurs in response to determining the difference is associated with an error and not a changed in the geographic location.

In Example 11, at least one of Examples 1-10 can further include, wherein altering the elevation data of the second DEM corresponding to the point includes reducing the elevation data of the second DEM corresponding to the point to be within the first threshold of corresponding elevation data of the first 3D point set.

Example 12 includes a system for DEM processing, the system comprising a DEM processor configured to receive, first and second DEMs including first elevation data of a geographic location and second elevation data of the geographic location, respectively, the second DEM generated after the first DEM, identify, by DEM processing circuitry, differences between the first elevation data and the second elevation data that are greater than a first threshold, determine, for a point in the second elevation data identified to correspond to a difference greater than the first threshold, a slope of the geographic location around and including the point, and alter, in response to determining the difference is greater than a second threshold determined based on the determined slope, elevation data of the second DEM corresponding to the point, and a display device to provide a view of the first elevation data, the second elevation data, and the altered elevation data.

In Example 13, Example 12 can further include, wherein the 3D point set processor is further configured to, before identifying the differences determine a point spacing between adjacent points of the first DEM and a point spacing between adjacent points of the second DEM, and project points of the first and second elevation data to a two-dimensional (2D) grid of cells.

In Example 14, Example 13 can further include, wherein the DEM processor is further configured to, for each point in the second elevation data, identify a closest respective point of the first elevation data, and wherein identify difference between the first elevation data and the second elevation data includes, for each point in the second elevation data, determining a difference between the point in the second elevation and the identified closest respective point of the first elevation data.

In Example 15, Example 14 can further include, wherein the DEM processor is further configured to, for each point in the second elevation data, compare the determined difference to the first threshold.

In Example 16, at least one of Examples 13-15 can further include, wherein the 2D grid of cells includes a regular spacing between cells and the regular spacing is equal to the determined spacing between points of the first DEM or the second DEM.

In Example 17, at least one of Examples 12-16 can further include, wherein the second threshold is one of a plurality of different thresholds for non-overlapping ranges of slope.

In Example 18, Example 17 can further include, wherein the second threshold is smaller for a first range of slopes that is less than a second range of slopes.

In Example 19, at least one of Examples 17-18 can further include, wherein the first threshold is less than, or equal to, the smallest of the plurality of different thresholds.

In Example 20, at least one of Examples 12-19 can further include, wherein the DEM processor is further configured to, before altering the elevation data of the second DEM corresponding to the point and in response to determining the difference is greater than the second threshold, analyzing image data used to generate the first and second DEMs to determine whether the difference is associated with an error or a change in the geographic location.

In Example 21, Example 20 can further include, wherein altering elevation data of the second DEM corresponding to the point occurs in response to determining the difference is associated with an error and not a changed in the geographic location.

In Example 22, at least one of Examples 12-21 can further include, wherein altering the elevation data of the second DEM corresponding to the point includes reducing the elevation data of the second DEM corresponding to the point to be within the first threshold of corresponding elevation data of the first DEM.

Example 23 includes a non-transitory machine-readable medium including instructions, that when executed by a machine, configure the machine to perform operations comprising receiving, first and second three DEMs including first elevation data of a geographic location and second elevation data of the geographic location, respectively, the second DEM generated after the first DEM, identifying, by DEM processing circuitry, differences between the first elevation data and the second elevation data that are greater than a first threshold, determining, for a point in the second elevation data identified to correspond to a difference greater than the first threshold, a slope of the geographic location around and including the point, and altering, in response to determining the difference is greater than a second threshold determined based on the determined slope, elevation data of the second DEM corresponding to the point.

In Example 24, Example 23 can further include, wherein the second threshold is one of a plurality of different thresholds for non-overlapping ranges of slope.

In Example 25, at least one of Examples 23-24 can further include, wherein the second threshold is smaller for a first range of slopes that is less than a second range of slopes.

In Example 26, at least one of Examples 23-25 can further include, wherein the first threshold is less than, or equal to, the smallest of the plurality of different thresholds.

In Example 27, at least one of Examples 23-26 can further include, wherein the operations further include, before identifying the differences determining a point spacing between adjacent points of the first DEM and a point spacing between adjacent points of the second DEM, and projecting points of the first and second elevation data to a two-dimensional (2D) grid of cells.

In Example 28, Example 27 can further include, wherein the operations further include, for each point in the second elevation data, identifying a closest respective point of the first elevation data, and wherein identifying difference between the first elevation data and the second elevation data includes, for each point in the second elevation data, determining a difference between the point in the second elevation and the identified closest respective point of the first elevation data.

In Example 29, Example 28 can further include, for each point in the second elevation data, comparing the determined difference to the first threshold.

In Example 30, at least one of Examples 27-29 can further include, wherein the 2D grid of cells includes a regular spacing between cells and the regular spacing is equal to the determined spacing between points of the first DEM or the second DEM.

In Example 31, at least one of Examples 23-30 can further include, before altering the elevation data of the second DEM corresponding to the point and in response to determining the difference is greater than the second threshold, analyzing image data used to generate the first and second DEMs to determine whether the difference is associated with an error or a change in the geographic location.

In Example 32, Example 31 can further include, wherein altering elevation data of the second DEM corresponding to the point occurs in response to determining the difference is associated with an error and not a changed in the geographic location.

In Example 33, at least one of Examples 23-32 can further include, wherein altering the elevation data of the second DEM corresponding to the point includes reducing the elevation data of the second DEM corresponding to the point to be within the first threshold of corresponding elevation data of the first DEM.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for ensuring accuracy of data in a first digital elevation model (DEM), the method comprising:
   receiving, the first DEM and a second DEM including first elevation data of a geographic location and second elevation data of the geographic location, respectively;
   identifying, by DEM processing circuitry, differences between the first elevation data and the second elevation data that are greater than a first threshold;
   determining, for a point in the second elevation data identified to correspond to a difference greater than the first threshold, a slope of the geographic location around and including the point; and
   altering, in response to determining the difference is greater than a second threshold determined based on the determined slope, elevation data of the second DEM corresponding to the point.

2. The method of claim 1, further comprising before identifying the differences:
   determining a point spacing between adjacent points of the first DEM and a point spacing between adjacent points of the second DEM; and
   projecting points of the first and second elevation data to a two-dimensional (2D) grid of cells.

3. The method of claim 2, further comprising:
   for each point in the second elevation data, identifying a closest respective point of the first elevation data; and
   wherein identifying difference between the first elevation data and the second elevation data includes, for each point in the second elevation data, determining a difference between the point in the second elevation and the identified closest respective point of the first elevation data.

4. The method of claim 3, further comprising, for each point in the second elevation data, comparing the determined difference to the first threshold.

5. The method of claim 2, wherein the 2D grid of cells includes a regular spacing between cells and the regular spacing is equal to the determined spacing between points of the first DEM or the second DEM.

6. The method of claim 1, wherein the second threshold is one of a plurality of different thresholds for non-overlapping ranges of slope.

7. The method of claim 6, wherein the second threshold is smaller for a first range of slopes that is less than a second range of slopes.

8. The method of claim 6, wherein the first threshold is less than, or equal to, the smallest of the plurality of different thresholds.

9. The method of claim 1, further comprising, before altering the elevation data of the second DEM corresponding to the point and in response to determining the difference is greater than the second threshold, analyzing image data used to generate the first and second DEMs to determine whether the difference is associated with an error or a change in the geographic location.

10. The method of claim 9, wherein altering elevation data of the second DEM corresponding to the point occurs in response to determining the difference is associated with an error and not a changed in the geographic location.

11. The method of claim 1, wherein altering the elevation data of the second DEM corresponding to the point includes reducing the elevation data of the second DEM corresponding to the point to be within the first threshold of corresponding elevation data of the first DEM.

12. A system for digital elevation model (DEM) processing, the system comprising:
    a DEM processor configured to:
      receive, first and second DEMs including first elevation data of a geographic location and second elevation data of the geographic location, respectively, the second DEM generated after the first DEM;
      identify differences between the first elevation data and the second elevation data that are greater than a first threshold;
      determine, for a point in the second elevation data identified to correspond to a difference greater than the first threshold, a slope of the geographic location around and including the point; and
      alter, in response to determining the difference is greater than a second threshold determined based on the determined slope, elevation data of the second DEM corresponding to the point; and a display device to provide a view of the first elevation data, the second elevation data, and the altered elevation data.

13. The system of claim 12, wherein the DEM processor is further configured to, before identifying the differences:

determine a point spacing between adjacent points of the first DEM and a point spacing between adjacent points of the second DEM; and project points of the first and second elevation data to a two-dimensional (2D) grid of cells.

14. The system of claim 13, wherein the DEM processor is further configured to:

for each point in the second elevation data, identify a closest respective point of the first elevation data; and wherein identify difference between the first elevation data and the second elevation data includes, for each point in the second elevation data, determining a difference between the point in the second elevation and the identified closest respective point of the first elevation data.

15. The system of claim 14, wherein the DEM processor is further configured to, for each point in the second elevation data, compare the determined difference to the first threshold.

16. The system of claim 13, wherein the 2D grid of cells includes a regular spacing between cells and the regular spacing is equal to the determined spacing between points of the first DEM or the second DEM.

17. A non-transitory machine-readable medium including instructions, that when executed by a machine, configure the machine to perform operations comprising:

receiving, first and second digital elevation models (DEMs) including first elevation data of a geographic location and second elevation data of the geographic location, respectively;

identifying differences between the first elevation data and the second elevation data that are greater than a first threshold;

determining, for a point in the second elevation data identified to correspond to a difference greater than the first threshold, a slope of the geographic location around and including the point; and altering, in response to determining the difference is greater than a second threshold determined based on the determined slope, elevation data of the second DEM corresponding to the point.

18. The non-transitory machine-readable medium of claim 17, wherein the second threshold is one of a plurality of different thresholds for non-overlapping ranges of slope.

19. The non-transitory machine-readable medium of claim 18, wherein the second threshold is smaller for a first range of slopes that is less than a second range of slopes.

20. The non-transitory machine-readable medium of claim 18, wherein the first threshold is less than, or equal to, the smallest of the plurality of different thresholds.

* * * * *